Sept. 14, 1926.  1,599,686
F. STARR
TRANSMISSION MECHANISM FOR OCCUPANT PROPELLED VEHICLES
Filed June 8, 1925

INVENTOR.
Fred Starr
BY M. C. Frank
ATTORNEY.

Patented Sept. 14, 1926.

1,599,686

UNITED STATES PATENT OFFICE.

FRED STARR, OF OAKLAND, CALIFORNIA.

TRANSMISSION MECHANISM FOR OCCUPANT-PROPELLED VEHICLES.

Application filed June 3, 1925. Serial No. 35,514.

My invention relates in general to occupant-propelled vehicles and has particular reference to a propelling or transmission mechanism for such vehicles.

In its preferred form, the transmission mechanism has been devised for use in combination with a child's vehicle such as shown and described in my Patent No. 1,500,854, of July 8, 1924. The transmission mechanism identified in the present application is also an improvement over the form described in my co-pending application filed October 28, 1922, Serial No. 597,484.

Briefly, the principal object of my present case is to develop a transmission mechanism in which a forward or reverse drive may be selectively imparted to the vehicle and at the will of the operator, and also to combine the selective drive with means for maintaining the same in active or in neutral position as for coasting. While these features are included in my former embodiments, the present form is a decided improvement thereover, owing to its simple and other salient features which will appear as the description of the invention proceeds with reference to the accompanying sheet of drawings.

In said drawings Figure 1 is a view in side elevation of the general assembly of the invention with part of the same shown in section.

Figure 1:
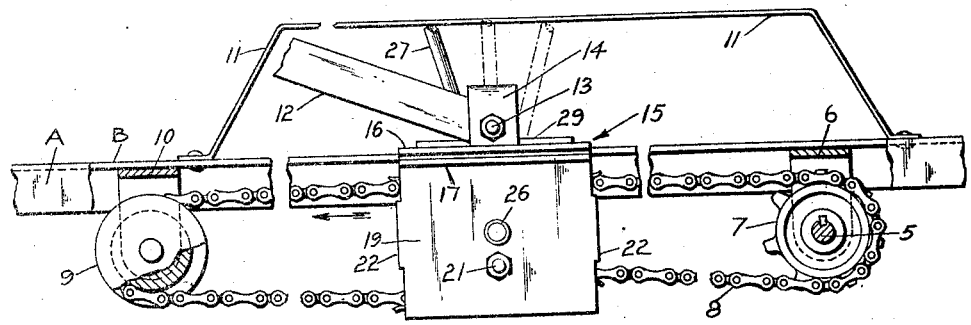

Referring to the drawings in detail the same will be described, for convenience, in combination with a vehicle of the type which is propelled by the occupant thereof such as a child's coaster wagon, but it is to be borne in mind that the transmission mechanism may be used wherever applicable and in particular in conjunction with self-propelled traction devices.

Throughout the figures similar reference letters and numerals indicate similar parts. A and B represent a pair of spaced parallel angle irons which are made to serve as frame members for the vehicle. The vehicle wheels (not shown) which are preferably four in number, may be mounted upon axles hung from the frame members and which provide a pair of steering wheels and a pair of ground or drive wheels. The axle for the ground wheels is shown at 5 with the same suspended from the frame members by suitable brackets or the like 6. This axle 5 is the rear one and it provides a mounting for the drive sprocket wheel 7 and the same is keyed to the axle to rotate it, and thus impart the required drive to the ground wheels which are mounted upon the axle so as to rotate with it.

The sprocket chain 8, which may be the ordinary bicycle chain, after passing around the wheel 7 extends longitudinally of the frame and around an idler wheel 9, which is supported in a bracket 10 secured to the underside of the frame members and in alignment with the wheel 7. This makes a suitable mounting for the sprocket chain so that the same is adapted to travel between the frame members A and B.

To propel the vehicle, the chain 8 is driven by means which will be presently described, and which chain in turn drives the ground wheels through the medium of the sprocket wheel 7 and the axle 5. A base for the vehicle seat is represented by the bridge members 11 which are mounted upon the frame members respectively.

Figure 3:
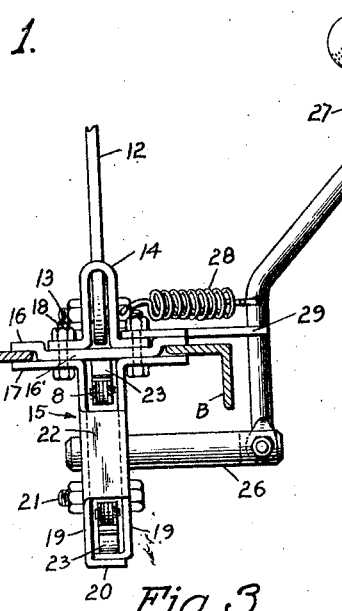
Fig. 3 is an end elevation of Fig. 2 and with the said removed side in place.
Figure 5:
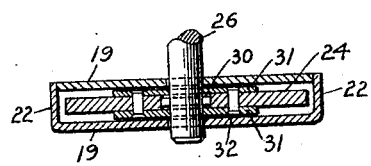
Fig. 5 is a horizontal section through the crosshead on the line 5—5 of Fig. 2 with the portion of the shift lever pin shown in full.

From the above described assembly it will be seen that by imparting a movement to the upper limb of the endless chain 8 in the direction of the arrow, Fig. 1, the ground wheels will be driven in a direction to propel the vehicle forward, whereas by reversing the direction of the movement the vehicle will be propelled backward or in a reverse direction. To accomplish this object in a simple and positive manner is really the crux of the present invention, and I prefer to realize the desired object by the following structure:

First of all I provide a pitman 12 which may be reciprocated by a handle-bar oscillating lever (not shown) rocked back and forth by the seated occupant. The pitman is pivoted as at 13 to an upstanding bracket 14 secured to the top of the crosshead represented in general by 15. The term crosshead will be used to identify the mechanism made to slide back and forth between the frame members A and B, the horizontal flanges of these members serving as a guide or track for the crosshead. This is made possible by clamping spaced plate flanges 16 and 17 together by bolts or the like 18 Fig. 3, to receive the horizontal flanges of the frame members. The plate 16' provides a cover for the box-like housing of the crosshead, and the flanges 17 are formed as continuations of the sides 19 which extend downwardly in spaced relation, and with their extremities turned inwardly in overlapping relation to make up a bottom 20. While the sides 19 are held together by a bolt 21, one of them is further provided with tongues 22 intermediate its top and bottom and the same are bent over to bridge the space between the two sides both at the front and rear. The sprocket chain passes through the box-like assembly of the crosshead at both sides of the bent-over tongues 22.

Leaf springs 23 riveted or otherwise secured intermediate their ends to the inside of the top and bottom of the crosshead housing, overlie the chain 8 to take up the slack in the same and also hold the chain under spring tension so that it may be engaged by the head 24 in the following manner: Opposite ends of the head 24 are formed with double-ended grabs or hooks 25 which are adapted to engage the top and bottom limbs of the chain one at a time, and pull the chain along with the crosshead as the latter travels between the frame members induced by the pull of the pitman.

The head 24 is mounted upon the pin 26 which projects through the housing of the crosshead and the said head is secured to the pin by a key 30 which projects through a keyway in the pin, and engages the head at diametrically opposite sides of the opening therein and in which opening the key seats. On opposite sides of the head are plates 31 with rivets or the like 32 securely clamping them to the head and locking the key and pin to prevent lateral displacement of the pin in the crosshead.

Figure 2:
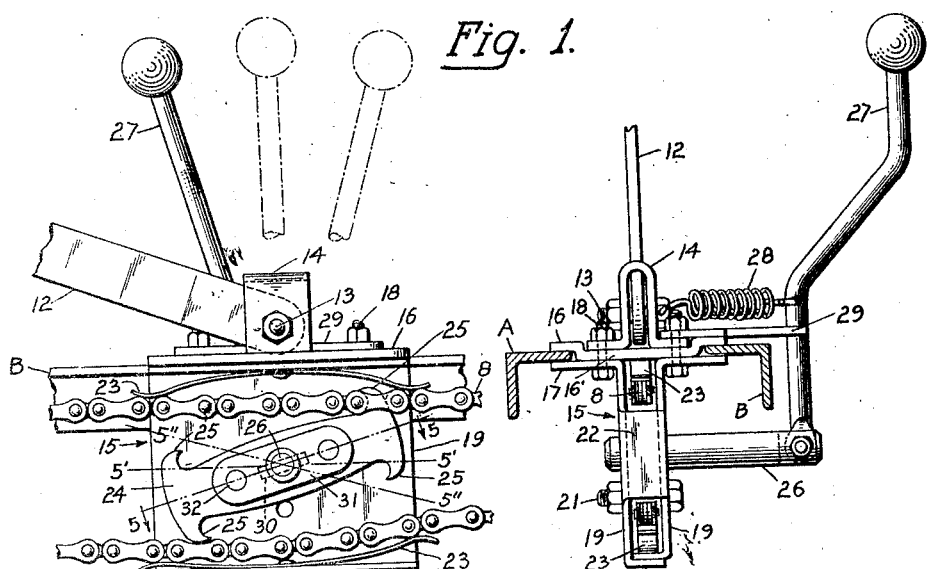
Fig. 2 is a detailed view in side elevation of the crosshead structure in particular and with a side of the housing removed.
Figure 4:
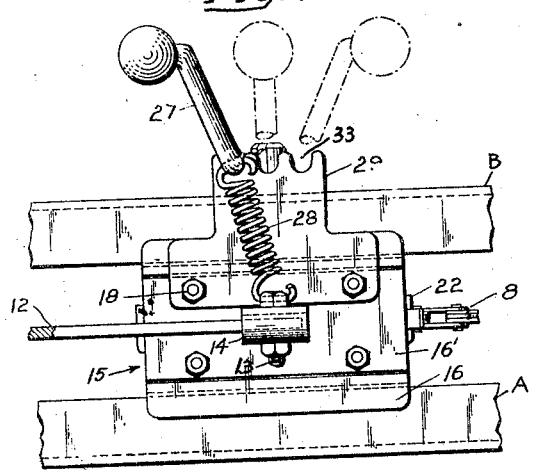
Fig. 4 is a plan of the general assembly and showing to advantage the shift lever and notches for the various shifts.

The pin 26 at its other end is pivotally connected in any suitable manner with a shift lever 27, positioned within easy reach of the occupant of the vehicle so that the lever may be shifted to any of the three positions as shown by the dotted lines of the lever in Figs. 2 and 4. Any of the three positions is selectively chosen by the occupant and can be identified as a "forward drive," "neutral or coasting position" and a "reverse drive." The lever 27 is held under tension of the spring 28 and can be moved into and out of any one of the three notches 33 in the plate 29, the notches being arranged to correspond to the two different drives and the neutral position.

*Operation.*

Assuming that the occupant desires to propel the vehicle forward, he or she will move the shift lever 27, as shown in Fig. 4, into the first notch. This movement will turn the head 24 to a position as shown in Fig. 2, whereby one hook of the head will engage a link of the upper limb of the chain, the upper leaf spring 23 assisting the engagement by urging the chain toward the head and thus assure the connection. The occupant will then move the oscillating lever (not shown) of the vehicle in either direction and the pitman 12 and the crosshead 15 will move forward, and thus pull the upper limb of the chain with it while the lower limb will move backward and the links thereof bump over the lowermost hook. The moving upper limb will rotate the sprocket wheel 7 counterclockwise and impart a forward movement to the ground wheels. Another movement of the oscillating lever will reverse the direction of the crosshead, and the said lowermost hook will then grab or engage a link of the lower limb and pull the said limb in the same general direction of the chain travel, while the diagonal hook will this time bump over the links of the upper limb, the two leaf springs all the while urging the limbs toward the head.

If the occupant desires to coast, he will move the shift lever 27 into the middle notch and which will position the head 24 horizontally as indicated by the dot-and-dash center line 5'—5' of Fig. 2 and entirely out of engagement with the chain, so that the back and forth movement of the crosshead will be without effect, and hence no movement thereof or of the oscillating lever is necessary.

For a reverse drive the occupant will shift the lever 27 into the last notch and which will turn the head 24 as indicated by the dot-and-dash center line 5''—5'', so that the other pair of diagonal hooks will similarly and alternately engage the respective limbs of the chain and impart a movement thereto to rotate the sprocket wheel 7 clockwise and thus drive the vehicle backwards.

It is also to be observed that if the vehicle is being propelled forward or backward on a grade, the occupant may, if he chooses, cease operating the oscillating lever and crosshead follower, and the momentum of the vehicle will cause the traveling chain to continue and to bump over the links of both limbs of the chain simultaneously. This action, in a measure, acts as a brake to check the acceleration of the vehicle. If it is desired to reengage or get in gear again with the links of the chain belt while going down grade, the occupant will again operate the oscillating lever and at a rate of speed just a little faster than the moving chain, and it is obvious that this action will cause the hooks 25 to alternately slip into the links and continue the movement of the chain and the gradual stoppage of the same at the will of the operator.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States is the following:

1. In a transmission mechanism of the class described, an endless chain, a crosshead adapted to reciprocate along the chain, a chain grab on the crosshead for alternately engaging the upper and lower limbs of the chain for driving the same in a continuous direction, said chain grab comprising an elongated block disposed between the upper and lower limbs of the chain, chain engaging means on the block at the ends thereof and means for turning the block to move the chain engaging means thereof into engagement with the upper and lower limbs of the chain and vice versa as desired.

2. In a transmission mechanism of the class described, a pair of spaced parallel frame members, a sprocket wheel suspended from said members, an axle rigidly connected to the sprocket wheel, an idler wheel also suspended from said frame members, an endless chain embracing said wheels, a crosshead embracing the chain and slidably mounted upon the frame members, means for sliding the crosshead, a chain grab carried by the crosshead comprising an elongated block having chain grabbing means thereon at its ends, said block being pivotally mounted between the upper and lower limbs of the chain, and means for turning the block to bring the chain grabbing means into alternate grabbing relation with the limbs of the chain.

3. In a crosshead structure for transmission mechanisms, a slidable housing, a chain having upper and lower limbs passing therethrough, a chain grab in said housing between the said upper and lower limbs, said chain grab having chain engaging means thereon at its ends, means for turning the grab through a predetermined angle to bring the chain grabbing means into alternate engagement with the limbs of the chain, and spring means carried by said housing urging the limbs toward the said grab.

4. A structure as specified in claim 3 in which the said turning means is also adapted to move the chain grab into a neutral position whereby the said chain engaging means will be out of engagement with both limbs of the chain.

5. The combination as set forth in claim 2 and in which the chain grab is adapted to assume a position whereby the said chain grabbing means will be out of engagement with both the upper and lower limbs of the chain.

6. In a transmission mechanism of the class described, a sliding crosshead, an endless chain passing therethrough having upper and lower limbs, an elongated plate on the crosshead disposed between the chain limbs, said plate having hooks formed at its respective end corners and means for turning the plate through an angle to bring a diagonal pair of hooks into alternate engagement with the chain limbs, and spring means carried by said housing urging the limbs toward the said hooks.

7. A structure as specified in claim 6 in which the said plate turning means is also adapted to turn the plate to a neutral position whereby the said hooks will be out of engagement with both limbs of the chain.

8. In a transmission mechanism of the class described, a pair of spaced parallel frame members, a crosshead slidably mounted between said members, said crosshead including a housing having downwardly presented side walls, channels formed at the upper ends of the walls to receive the frame members to guide the crosshead, an endless chain passing through the crosshead having upper and lower limbs, an elongated plate between the walls of the crosshead, a pin carried by the walls and on which said plate is keyed, a shift lever for turning said pin and with it the elongated plate, hooks at the respective end corners of the plate, said shift lever adapted to position the plate for alternately bringing a pair of the diagonally positioned hooks into engagement with the upper and lower limbs of the chain.

9. A structure as specified in claim 8 in which the said shift lever is also adapted to turn the plate in a neutral position whereby the said hooks will be out of engagement with both the upper and lower limbs of the chain.

In testimony whereof, I affix my signature.

FRED STARR.